United States Patent [19]
Kanluen et al.

[11] Patent Number: 5,929,183
[45] Date of Patent: Jul. 27, 1999

[54] POLYFUNCTIONAL POLYMERS AS DEINKING AGENTS

[75] Inventors: Ratana Kanluen, Guelph; Brigitte H. Licht, Burlington, both of Canada

[73] Assignee: Huntsman Petrochemical Corporation, Austin, Tex.

[21] Appl. No.: 07/563,887

[22] Filed: Aug. 6, 1990

Related U.S. Application Data

[63] Continuation of application No. 07/330,651, Mar. 30, 1989., abandoned

[51] Int. Cl.$^6$ .......................... C08F 228/02; C08F 220/04
[52] U.S. Cl. ......................................... 526/287; 526/318.4
[58] Field of Search ................................. 526/287, 318.2, 526/318.4, 318.41, 318.42

[56] References Cited

U.S. PATENT DOCUMENTS

| | | | |
|---|---|---|---|
| 3,005,785 | 10/1961 | Jones | 525/330.1 |
| 3,880,765 | 4/1975 | Watson | 525/330.1 |
| 4,076,578 | 2/1978 | Puddington et al. | 162/5 |
| 4,463,152 | 7/1984 | Schulz | 526/307.5 |
| 4,469,611 | 9/1984 | Snyder, Jr. | 526/287 |
| 4,499,002 | 2/1985 | Masler, III | 526/307.5 |
| 4,612,352 | 9/1986 | Schaffer et al. | 525/404 |
| 4,814,102 | 3/1989 | Baur . | |
| 4,956,421 | 9/1990 | Denzinger | 525/385 |
| 4,977,059 | 12/1990 | Liang et al. | 430/138 |
| 5,039,433 | 8/1991 | Sopko et al. | 252/8.551 |
| 5,081,111 | 1/1992 | Akimoto | 525/327.7 |
| 5,104,951 | 4/1992 | Seelmann-Eggebert et al. | 526/240 |

FOREIGN PATENT DOCUMENTS

| | | |
|---|---|---|
| 1009804 | 5/1977 | Canada . |
| 2903150 | 8/1980 | Germany . |
| 3305637 | 8/1984 | Germany . |
| 5189180 | 4/1980 | Japan . |
| 5189280 | 4/1980 | Japan . |
| 11769082 | 7/1982 | Japan . |
| 59-99084 | 4/1984 | Japan . |
| 162160 | 9/1984 | Japan . |
| 7588986 | 4/1986 | Japan . |
| 8508987 | 4/1987 | Japan . |
| 2164339 | 3/1986 | United Kingdom . |
| 2178079 | 2/1987 | United Kingdom . |

OTHER PUBLICATIONS

Burt, L., Process Industries Canada, Oct./Nov. 1987, pp. 23–26.
Zabala, et al., Tappi Journal, Aug., 1988, pp. 62–68.
Wasilewski, O., 1987 Pulping Conference, pp. 25–28.
McKinney, R., 1987 Pulping Conference, pp. 29–32.
McCool, M., 1987 Pulping Conference, pp. 33–40.
Gilkey, et al., 1987 Pulping Conference, pp. 133–142.
Crow, et al., Tappi Journal, Jul. 1987, pp. 101–106.
Hornfeck, K., *Conservation and Recycling*, vol. 10, No. 23, pp. 125–132 (1987).

*Primary Examiner*—Christopher Henderson
*Attorney, Agent, or Firm*—Madan & Morris

[57] ABSTRACT

This invention presents a series of polyfunctional polymers useful as deinking agents. The polymers, which generally have molecular weights in the 2,000–100,000 range, can be used to effectively separate and remove ink in a variety of deinking processes, including flotation, wash, and mechanical, resulting in fibers of superior brightness.

6 Claims, No Drawings

POLYFUNCTIONAL POLYMERS AS DEINKING AGENTS

This application is a continuation of application Ser. No. 07/330,651, filed Mar. 30, 1989 now abandoned.

BACKGROUND OF THE INVENTION

In the past few decades, as both timber resources and available landfill sites have greatly diminished, the demand for recycling of printed papers, especially newsprint, has skyrocketed. Such recycling efforts have been aimed at developing processes whereby previously-used papers can be reprocessed and recycled for use. A major objective of such processes is the recovery of fibers which possess the physical properties and brightness of more expensive virgin pulp. End use considerations also play a major role in determining which parameters are critical for efficient recycling. Thus, for example, in newsprint ink holdout is of primary importance while in tissue, removal of fillers is critical to obtain a final product of satisfactory softness.

One major obstacle to the efficient recycling of such papers is the difficulties encountered in removing the ink from the printed paper before, during, or after the pulping process. This has become particularly difficult with newly developed inks and printing processes, which result in a much more tightly bound ink to the fibers. Improved deinking agents are needed to expand the utility of the deinking process. The deinking process and deinking agents have been discussed in many articles (see e.g. Crow and Secor, *Tappi Journal*, July 1987, pp 101–100; Wasilewski, 1987 *Pulping Conference Proceedings*, pp 25–31; McCool and Silveri, 1987 *Pulping Conference Proceedings*, pp 33–39; and Gilkey et al., 1987 *Pulping Conference Proceedings*, pp 133–141). Briefly, all such processes involve the removal of the ink from the recycled paper by use of deinking agents such as detergents or surfactants, and the subsequent separation of this removed ink from the pulp. This separation is accomplished by washing, wherein the ink is dispersed in the aqueous system and removed with the water using mechanical processes such as centrifugation or screening, by flotation, wherein the ink is suspended in the aqueous system made hydrophobic, and subsequently "floated" away from the pulp in a froth (the froth is then drawn out of the system by a vacuum or mechanical overflow system), by mechanical means (flocculation, screening, centrifugation, etc.) or by a combination of these processes. Since none of these systems will completely remove all of the ink, the deinking agents must also contain compounds or functional groups which prevent redeposition of the removed ink on the cleaned fibers.

To date, deinking agents used in these processes have not satisfactorily fulfilled all these functions. For example, U.S. Pat. No. 4,518,459, Canadian Pat. No. 1,009,804. German Patent No. 2,903,150 and Japanese Patent Nos. 51,892/80, 117,690/82, 59,990/84, 155,794/85 and 20 117,690/82 disclose conventional detergents, and surfactants for use in deinking, whereas the use of a combination of surfactants and polymers is described in Japanese Pat. Nos. 75,889/86 and 85,089/87 and UK Pat. Application GB 2,178,079A (published Feb. 4, 1987). The mixtures produce a satisfactory gain in brightness of the pulp, but the pulp still contain residual ink, including large spots, which renders the pulp unsuitable for use in many applications.

Further, as new printing ink formulations and printing processes are developed, and the demand for recycling other types of waste papers (including films, foil coated papers, and pulp-colored papers) increases, there exists a real need for improved deinking agents which can effectively remove the printed ink from these furnishes.

SUMMARY OF THE INVENTION

It is an object of this invention to provide improved deinking agents which are capable of effectively removing ink from a recyclable paper leaving ink-free pulp suitable for incorporation in applications requiring high grade papers. It is further an object of this invention to provide deinking agents which can be used with a variety of printed media, including films, foil-coated papers, and pulp-colored papers.

The above and related objects are realized by the deinking agents of this invention, which are polyfunctional polymers of the two general formulas. The first formula is

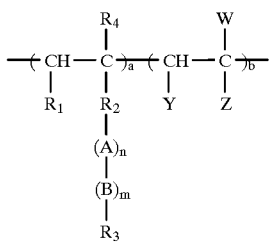

wherein:

$R_1$=H, $C_2$–$C_8$ alkyl, or

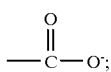

$R_2$=$C_1$–$C_{12}$ alkylene or

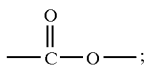

$R_3$=H, or branched or straight chain $C_1$–$C_{22}$ alkyl or alkylphenol $R_4$ is H or $C_1$–$C_4$ alkyl;

A=—(CH$_2$—CH$_2$—O)—;

B=

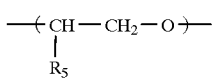

(wherein $R_5$ is $C_1$–$C_4$ alkyl or phenyl);

W and Y=H or $C_1$–$C_4$ alkyl; and

Z=

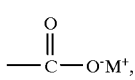

$-SO_3^-M^+$, or

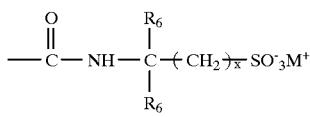

(wherein M is ammonium or alkali metal, $R_6$ is $C_1$–$C_4$ alkyl, and x is an integer of at least 1); or

(wherein M is ammonium or alkali metal). When Z is the last compound, Y and W are preferably H and $CH_3$, respectively.

In the above agents: a and b are both positive integers of at least one and the ratio of a/b is 1/100 or greater; n is a positive integer of 10–100 and m=0–50 wherein the ratio of n/m is 1.5/1 or greater if m is not 0.

The second formula is

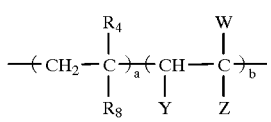

wherein $$R_8 = \underset{O}{\overset{\parallel}{-C}}-C-O-R_7 \text{ or } \underset{O}{\overset{\parallel}{-C}}-N\overset{H}{\underset{R_7}{\diagdown}}$$

$R_7 = C_6$–$C_{22}$ straight or branched chain alkyl and $R_4$, W, Y, Z, a, and b are as above.

These agents are prepared by the reaction of an ethylenically unsaturated monomer with at least one surfactant macromonomer or hydrophobic monomer, and typically have molecular weights in the range of 2,000–100,000. Such agents can be added to the paper recycling mixture before, during, or after the pulping process, and are generally used at a treatment levels of 0.05%–1% (by weight based on the weight of dry pulp). These agents can be used in the flotation and wash and mechanical separation deinking processes, and will result in pulp of exceptional brightness, regardless of the deinking process used.

DETAILED DESCRIPTION OF INVENTION

The polyfunctional deinking agents of this invention comprise copolymers of ethylenically unsaturated monomers of the anionic type and one or more functional macromonomers. The macromonomers fall within three broad classes and, thus, the deinking agents comprise three classes of compounds.

Regardless of the class, the anionic-type ethylenically unsaturated monomers are of the following formula:

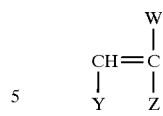

wherein:

W,Y are H or $C_1$–$C_4$ alkyl

Z is selected from

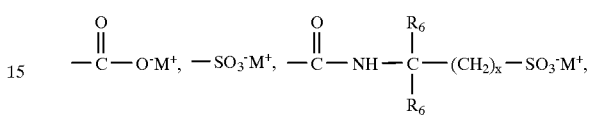

and

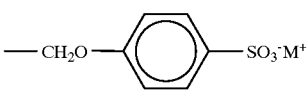

(in which case Y=H, and W=$CH_3$) wherein: $R_6$ is $C_1$–$C_4$ alkyl, x is a positive integer of at least 1.

W and Y can be the same or different and are preferably H or $CH_3$.

Z is preferably

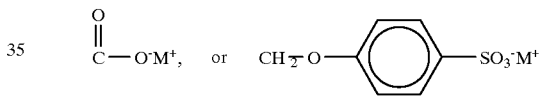

and M is preferably sodium (Na).

In the first class of deinking agents, the ethylenically unsaturated monomer of the anionic type is copolymerized with at least one surfactant macromonomer. The surfactant macromonomers have one of the three following formulas:

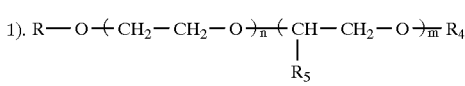

wherein:

R is $C_3$–$C_{22}$ alkenyl or carboxy alkenyl;

$R_4$ is H or $C_1$–$C_4$ alkyl;

$R_5$ is $C_1$–$C_4$ alkyl or phenyl.

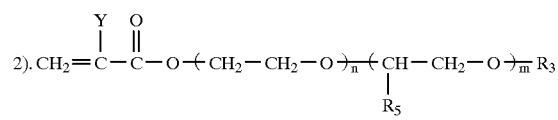

wherein:

$R_5$ is the same as above;

$R_3$ is H or straight or branched chain $C_1$–$C_{22}$ alkyl or alkylphenol;

Y is H or $C_1$–$C_4$ alkyl.

3). $$CH=CH-\underset{\underset{O^-}{\overset{C}{\underset{\|}{C}}}\diagdown O^-}{\overset{O}{\underset{\|}{C}}}-O-(CH_2-CH_2-O)_n-(\underset{R_5}{\overset{|}{CH}}-CH_2-O)_m-R_3$$

wherein $R_5$, $R_3$ are the same as above.

In all of the above:

n is a positive integer of 10–100, preferably 20–50.

m is 0 or a positive integer of 0–50, preferably 4–20.

n/m is at least 1.5 when m≠0, preferably 2–3.

In this class of polymers, the amount of surfactant macranonomer copolymerized with the ethylenically unsaturated monomner is at least 10%, by weight, preferably 25–60%.

In the second class of functional polymers contemplated by this invention, the polymers are produced by the copolymerization of at least one (1) hydrophyllic surfactant macromonomer, at least one (1) hydrophobic monomer, and at least one (1) ethylenically unsaturated vinyl monomer of the anionic type.

The hydrophyllic surfactant macromonomers are of the three following formulas:

1) $$R-O-(CH_2-CH_2-O)_n-(\underset{R_5}{\overset{|}{CH}}-CH_2-O)_m-H$$

wherein R=$C_3$–$C_{22}$ alkenyl or carboxy alkenyl $R_5$ is $C_1$–$C_4$ alkyl or phenyl.

2) $$CH=CH-\underset{\underset{O^-}{\overset{C}{\underset{\|}{C}}}\diagdown O^-}{\overset{O}{\underset{\|}{C}}}-O-(CH_2-CH_2-O)_n-(\underset{R_5}{\overset{|}{CH}}-CH_2-O)_m-R_3$$

wherein $R_3$ is H or $C_1$–$C_{22}$ straight or branched chain alkyl or alkyl phenol and $R_5$ is as above.

3) $$CH_2=\overset{Y}{\underset{|}{C}}-\overset{O}{\underset{\|}{C}}-O-(CH_2-CH_2-O)_n-(\underset{R_5}{\overset{|}{CH}}-CH_2-O)_m-H$$

wherein Y=H or $C_1$–$C_4$ alkyl and $R_5$ is as above.

The hydrophobic monomers are of the four following formulas:

1) $$CH_2=\overset{Y}{\underset{|}{C}}-\overset{O}{\underset{\|}{C}}-O-(CH_2-CH_2-O)_n-(\underset{R_5}{\overset{|}{CH}}-CH_2-O)_m-R_3'$$

2) $$R-O-(CH_2-CH_2-O)_n-(\underset{R_5}{\overset{|}{CH}}-CH_2-O)_m-R_4'$$

3) $$CH_2=\overset{Y}{\underset{|}{C}}-\overset{O}{\underset{\|}{C}}-NH-R_7$$

4) $$CH_2=\overset{Y}{\underset{|}{C}}-\overset{O}{\underset{\|}{C}}-O-R_7$$

wherein R, $R_5$, and Y are as above, $R_3'$ is $C_1$–$C_{22}$ straight or branched chain alkyl or alkylphenol, $R_4'$ is $C_1$–$C_4$ alkyl and $R_7$ is $C_6$–$C_{22}$ straight or branched alkyl.

In this class of polymers, m and n are as defined above, the amount of hydrophobic monomer copolymerized is at least 1% by weight and the amount of hydrophyllic macromoncmer copolymerized is at least 10% by weight. Preferably, the polymers comprise 2–5% hydrophobic monomer and 20–60% hydrophyllic macromoncmer.

The third class of functional polymers contemplated by this invention comprises copolymers of at least one (1) hydrophobic macromonomer and at least one (1) ethylenically unsaturated monomer of the anionic type. The hydrophobic monomers are of the same formulas as the hydrophobic monomers of the second class and n and m are as in the first class. The amount of hydrophobic macromonomer copolymerized with the ethylenically unsaturated monomer is at least 1% by weight preferably 5–15%.

Regardless of the monomers used, the polymers produced have a molecular weight of at least 2000, preferably 5000–40,000. It is recognized, however, that the molecular weights can be increased as the particular applications dictate and, specifically, that polymers having molecular weights well in excess of 100,000 can be produced and utilized in deinking processes. The polymers can be produced by any convenient aqueous polymerization method, including solution polymerization in the presence of a suitable cosolvent, micellar polymerization, or emulsion polymerization. It is further contemplated that graft copolymerization methods can also be used to obtain functional polymers suitable for use in deinking. The actual method used will be dictated by personal preference, material availability and activity, as well as the properties of the particular monomers utilized.

The polymer produced can be used in any conventional deinking process including flotation, wash, and mechanical separation., Regardless of the process used, the polymer is added at a convenient time during the deinking process. Treatment levels range from 0.001 to 1% (by weight based on weight of dry pulp), preferably 0.01 to 0.7% by weight. However, these levels can vary depending upon the particular process employed, the particular furnish, and the particular functional polymer.

The functional polymers of this invention can be used with any furnishes which are commonly recycled (such as newsprint), as well as other furnishes such as laser printed papers, flexographic printed papers, pulp colored papers, foil-coated papers, plastic coated papers, etc. A list of commonly recycled papers is presented in circular PS-86 of the Paper Stock Institute of America (April, 1986, pp 4–8) incorporated herein by reference.

EXAMPLES

The following examples illustrate certain preferred embodiments of this invention and are not intended to be illustrative of all embodiments.

EXAMPLE I PREPARATION OF DEINIKING POLYMERS

Representative deinking polymers of this invention were prepared as described below.

Polymer A

In this example, a functional polymer comprising a surfactant macromonomer, monomethacrylate PEG 2000, and a vinyl monomer (acrylic acid) was prepared.

Briefly, a mixture of 450 g-deionized water and 20 g of isopropyl alcohol was charged to a 2 liter glass reactor equipped with a reflux condenser, stirrer, thermometer and two inlet ports for the addition of monomer and catalyst. After the mixture was refluxed for 10 minutes at 90° C., 300 g of a monomer mixture, comprising 100 g each of acrylic acid, monomethacrylate PEG (polyethylene glycol) 2000 (approx. 40 EO, mol wt.=2000) and deionized water, and 80 g of 1.875% aqueous sodium persulfate solution were continuously pumped into the reactor while the temperature was maintained at about 90±2° C. The system was then incubated at 90±2° C. for an additional 30 minutes, after which a 40 g charge of 2.5 % aqueous sodium persulfate was added. The reaction mixture was subsequently maintained at 90 +2° C. for an additional hour, and then neutralized to pH 7 with 50% caustic soda. The neutralized product was subsequently vacuum distilled, removing 70 g of distillate, and leaving viscous, clear straw-colored liquid product, with a solids content of 29.7% and a pH of about 7.0. The polymer produced had a weight average molecular weight (M.W.) of about 100,000 (as measured by gel permeation chromatography using sulfonated polystyrene as the standard). This was retained as Polymer A.

Polymer B-1 and B-2

In this example, a second functional polymer containing allyl alcohol ethoxylate (24 EO)and acrylic acid was prepared. Briefly the procedure followed was identical to that used in the preparation of Polymer A, except that the acrylic acid/allyl alcohol ethoxylate (24 EO) ratio was 80/20. Two preparations were made, differing in the amount of catalyst used. The products obtained had solids contents of 27.5% and 29.7% and respective weight average molecular weights of 75,000 (B-1) and 25,000 (B-2).

Polymer C

In this example, a functional polymer containing acrylic acid and allyl alcohol ethoxylate (44 EO) was prepared following the procedure of Polymer A. The weight ratio of acrylic acid to allyl 44 EO was 80/20.

The product had a solid content of 31% and a weight average molecular weight of 23,000.

Polymer D-1 and D-2

In this example, functional polymers derived from two anionic vinyl monomers (acrylic acid and maleic acid) and a hydrophobic monomer (t-octylacrylamide) were prepared. The formulations were as follows:

|   | Material | D-1 | D-2 |
|---|---|---|---|
| A. | toluene | 250 g | 250 g |
|   | maleic anhydride | 49.1 g | 49.1 g |
| B. | toluene | 70 g | 70 g |
|   | acrylic acid | 71.5 g | 69.9 g |
|   | t-octyl acrylamide | 1.4 g | 5.5 g |

-continued

|   | Material | D-1 | D-2 |
|---|---|---|---|
| C | toluene | 35 g | 35 g |
|   | benzoyl peroxide | 2.4 g | 2.4 g |
| D | distilled water | 400 g | 400 g |
|   | aqueous NaOH (25% W/V) | 230 ml | 230 ml |

Initially, the A part was charged to a 2 liter flask equipped with a thermometer, two addition funnels, stirrer, thermometer, and reflux condenser, and the system was heated to reflux; subsequently B and C were both slowly added simultaneously (B over 3 hours, C over 5 hours) with stirring. Once the addition was complete, the system was refluxed an additional 2 hours (a precipitate formed during this time), after which D was added. The toluene was then steam stripped from the system, and the pH was adjusted to 7.0–7.5.

Product D-1 had a solids content of 15.4% and a weight average molecular weight of 24,400, while D-2 had a solids content of 19.4% and a molecular weight of 20,200.

Polymer E

In this example, functional polymers derived from a surfactant monomer (allyl alcohol ethoxylate, 44 EO), a hydrophobic monomer (tridecyl methacrylate) and an anionic vinyl monomer (acrylic acid) were prepared. Briefly, a mixture of 450 g deionized water and 150 g n-propanol was charged to a 2 liter glass reactor equipped with a reflux condenser, stirrer, thermometer and two inlet ports for the addition of monomers and catalyst. After the mixture was refluxed for 10 minutes, a monomer mixture (comprising 135 g acrylic acid, 44 g allyl alcohol ethoxylate, 40 g deionized water, and 5 g triciecyl methacrylate) and 80 g of 1.25% sodium persulfate solution were continuously pumped into the reactor simultaneously over a period of three (3) hours, while the reaction temperature was maintained at E85° C. The system was subsequently incubated at 85° C. for an additional 10 minutes after the addition was complete, after which 20 g acrylic acid was pumped in, followed by 20 g of 2.5% sodium persulfate solution. The system was subsequently maintained at 85° C. for another hour, after which the reactor content was cooled to about 50° C. and neutralized to pH 7 with 50% caustic soda. The neutralized product was subsequently vacuum distilled to remove 280 g distillate, 50 g of deionised water was then added to form the final product, which was a white viscous liquid with a solids content of 28%. The polymer had a weight average molecular weight of 39,000.

EXAMPLE II DEINKING PROCEDURES

The above polymers were subjected to testing in flotation and wash deinking systems using the following procedures:

Flotation

The flotation procedure utilized a standard Wemco cell. Briefly, 1910 ml water was heated to 40–45° C. and charged to a Waring blender. Subsequently, the following is charged:

| a) Sodium Silicate | 1.0 ml |
|---|---|
| b) 35% Sodium Peroxide | 2.8 ml |
| c) 50% NaOH | 2.0 ml |

-continued

| d) DTPA (Kalex Penta) | 0.15 ml |
| e) Polymer | as per test | and the system is mixed for one (1) minute. A total of 92 g paper (69 g newsprint, 23 g magazine) is added, and the entire system is pulped in the blender at high speed for 2 minutes, followed by low speed for 8 minutes.

The resultant pulp is then diluted with 5750 ml water at 40–45° C. and transferred to the Wemco cell and frothed at 800 rpm for 5 minutes; the foam is collected from the system during this time through an outlet and 500 ml water is added to the system each minute to compensate for the foam removed. The amount of foam collected (in ml) is recorded and, after drying, the amount of fiber collected is determined (this is reported as a % of total fiber).

A pulp "pad" is then formed by filtering 1 liter of pulp on a Buchner funnel (through #4 paper) and subsequently pressing on a steel patten. The pads are evaluated for brightness by measuring reflectance on the Technibrite Micro TB-1C analyzer; this value is reported as a % of the reflectance of the MgO standard. This value is compared with the brightness of the raw pulp (pulper) and the gain in brightness is calculated. In general, the greater the gain in brightness, the better the degree of ink removal.

Wash

In this system, 1910 ml of water (as in the flotation procedure) is mixed with:

| a) DTPA (Kalex Penta) | 1.0 ml |
| b) Sodium Silicate | 0.85 ml |
| c) Polymer | as per test | for one minute. A total of 83 g newsprint is added, and the system is pulped as in the flotation procedure.

The deinked pulp is concentrated by straining through cheese cloth and manually squeezing dry. Fifty (50) g of this pulp is diluted with 2 liters of distilled water and disintegrated for 5 minutes in a standard commercial disintegrator. One (1) liter of this mixture is then filtered on a Buchner funnel and pressed on a steel patten, as in the flotation procedure to form a pad. The pad is examined as in the flotation procedure.

EXAMPLE III—FLOTATION DEINKING TEST

To assess the utility of the polymers of this invention in the flotation deinking process, a variety of polymers were compared with those listed in Example I at different treatment levels. The procedure followed was that of the flotation described in Example II. The results are presented in Table I.

TABLE I

Summary of Flotation Deinking Test Results

| Sample | Brightness (TAPPI) After Pulper | Brightness (TAPPI) Finished Pulp | Gain in Brightness | Fiber Loss (%) | Foam Collected (ml) | Treatment Level (% wt. based on dry pulp) |
|---|---|---|---|---|---|---|
| I[1] | 48.7 | 52.3 | 3.6 | 2.6 | — | 0.20 |
| II[2] | 51.2 | 55.7 | 4.5 | 3.7 | 850 | 0.20 |
| Polymer A | 55.3 | 59.6 | 4.3 | 4.5 | 1150 | 0.20 |
| Polymer B-1 | 54.2 | 57.6 | 3.4 | 4.3 | 1175 | 0.20 |
| Polymer C | 54.5 | 57.8 | 3.3 | 3.9 | 1000 | 0.20 |
| Polymer E | 53.4 | 57.8 | 4.4 | — | — | 0.20 |
| I[1] | 53.1 | 56.2 | 3.1 | 4.3 | — | 0.06 |
| II[2] | 51.2 | 54.6 | 3.4 | — | — | 0.06 |
| Polymer A | 52.6 | 57.8 | 5.2 | — | — | 0.06 |
| Polymer B-1 | 52.1 | 56.9 | 4.8 | — | — | 0.06 |
| Polymer C | 50.2 | 53.9 | 3.7 | 3.2 | — | 0.06 |
| Polymer D-1 | 51.7 | 56.1 | 4.4 | — | 1200 | 0.06 |
| Polymer D-2 | 54.0 | 59.2 | 5.2 | — | 1500 | 0.06 |
| III[3] | 52.0 | 56.2 | 4.2 | 4.1 | 1200 | 0.01 |
| IV[4] | 52.2 | 56.0 | 3.8 | 3.7 | 1200 | 0.01 |
| Polymer A | 53.0 | 57.8 | 4.8 | 5.0 | 1030 | 0.01 |
| Polymer B-1 | 53.1 | 61.0 | 7.9 | 4.6 | 1225 | 0.01 |
| Polymer D-2 | 50.4 | 55.9 | 5.5 | — | — | 0.01 |
| Polymer A | 50.0 | 58.4 | 8.4 | 4.0 | 1200 | 0.03 |
| Polymer B-1 | 50.7 | 57.8 | 7.1 | 4.3 | 1250 | 0.03 |

Notes
[1] A surfactant of the formula $C_{16-18}H_{33-37}O(EO)_{13}(PO)_{6.5}H$ (EO = ethylene oxide, PO = propylene oxide)
[2] A commercial surfactant deinking agent.
[3] A surfactant of the formula $C_{12-15}H_{25-31}O(EO)_9H$
[4] A surfactant of the formula $C_{12-15}H_{25-31}O(EO)_{4.5}(PO)_7H$ As shown, it can be seen that, at low treatment levels (below 0.20%), the polymers of this invention give a much better gain in brightness than the commercial surfactants. This indicates that a lower amount of deinking agent is required to obtain good ink removal.

Since some commercial surfactants are now used in conjunction with an accelerator or "auxilliary aid" to accomplish deinking, a series of experiments were conducted using such an aid, the sodium salt of polyacrylic acid (PAA) with commercial surfactants, The results are presented in Table II.

Again, it can be seen that the gain in brightness produced by the polymers of this invention is better than the gain observed with commercial agents, with or without the accelerators, even at very low treatment levels.

TABLE II

Summary of Accelerator Test Results

| Deinker | Accel. | Ratio of Deinker/Accel. (by wt.) | Brightness (TAPPI) After Pulper | Brightness (TAPPI) Finished Pulp | Brightness (TAPPI) Gain in Brightness | Fiber Loss (%) | Treatment Level (% by wt.) on dry pulp |
|---|---|---|---|---|---|---|---|
| I | None | — | 53.1 | 56.2 | 3.1 | 4.3 | 0.06 |
| II | None | — | 51.2 | 54.6 | 3.4 | — | 0.06 |
| Polymer A | None | — | 52.6 | 57.8 | 5.2 | — | 0.06 |
| Polymer B-1 | None | — | 52.1 | 56.9 | 4.8 | — | 0.06 |
| I | PAA (2,000 M.W.) | 20/80 | 54.4 | 57.7 | 3.3 | 3.6 | 0.06 |
| I | PAA (90,000 M.W.) | 20/80 | 54.6 | 58.0 | 3.4 | 3.9 | 0.06 |
| II | PAA (2,000 M.W.) | 50/50 | 55.4 | 57.7 | 2.3 | — | 0.06 |
| II | PAA (90,000 M.W.) | 80/20 | 51.4 | 54.2 | 2.8 | — | 0.06 |
| II | Polymer A | 80/20 | 53.3 | 56.9 | 3.6 | — | 0.06 |
| II | Polymer B-1 | 80/20 | 54.8 | 57.3 | 2.5 | — | 0.06 |
| I | Polymer A | 50/50 | 52.7 | 56.3 | 3.6 | 3.6 | 0.06 |
| I | Polymer B-__ | 50/50 | 52.6 | 55.4 | 2.8 | 3.5 | 0.06 |
| I | None | — | 55.3 | 58.6 | 3.3 | 4.2 | 0.03 |
| Polymer A | None | — | 50.0 | 58.4 | 8.4 | 4.0 | 0.03 |
| Polymer B-1 | None | — | 50.7 | 57.8 | 7.1 | 4.8 | 0.03 |

EXAMPLE IV DEINKING OF LASER PRINTED PAPER

To assess the utility of the functional polymers of this invention in deinking laser printed papers, experiments were conducted following the procedure of Example III, except that laser printed paper was used. The results are presented in Table III.

TABLE III

Summary of Laser Print Test Results

| Sample | Brightness (TAPPI) After Pulper | Brightness (TAPPI) Finished Pulp | Brightness (TAPPI) Gain in Brightness | Fiber Loss (%) | Foam Collected (ml) | Treatment Level (% wt. based on dry pulp) |
|---|---|---|---|---|---|---|
| B-2 | 74.06 | 82.07 | 8.01 | 4.40 | 1100 | 0.20 |
| C | 79.95 | 86.97 | 7.02 | 4.66 | 1000 | 0.06 |
| C | 74.63 | 82.69 | 8.06 | 3.48 | 1010 | 0.12 |

As shown, it can be seen that desirable gains in brightness are observed, even at low treatment levels.

EXAMPLE V WASH DEINKING TEST

To assess the utility of the polymers of this invention in a wash deinking process, Polymers A and B were compared with two commercial surfactants following the procedure of Example II (treatment level=31.0% by wt. using newsprint). The results are presented in Table IV.

TABLE IV

Summary of Wash Test Results

| Sample | Finished Pulp Brightness |
|---|---|
| $C_{12-15}H_{25-31}O(EO)_9H$ | 58.4 |
| $C_{12-15}H_{25-31}O(EO)_7H$ | 58.4 |

TABLE IV-continued

Summary of Wash Test Results

| Sample | Finished Pulp Brightness |
|---|---|
| Polymer A | 61.3 |
| Polymer B-1 | 60.5 |

As shown, it can be seen that the polymers of this invention produce brighter finished pulp.

It is apparent that many modifications and variations of this invention as hereinabove set forth may be made without departing from the spirit and scope thereof. The specific embodiments are given by way of example only and the invention is limited only by the terms of the appended claims.

What is claimed is:

1. A deinking agent comprising a polyfunctional polymer of the formula:

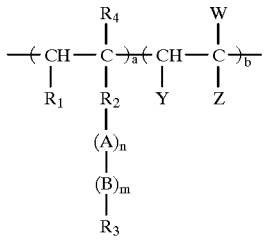

wherein:

$R_1$=H, $C_2$–$C_8$ alkyl, or

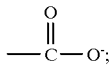

$R_2 = C_2-C_{12}$ alkylene or

$R_3$=H, or branched or straight chain $C_1-C_{22}$ alkyl or alkylphenol;

$R_4$=H or $C_1-C_4$ alkyl;

A=—$CH_2$—$CH_2$—O—;

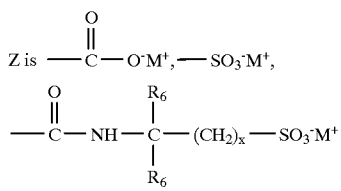

(wherein $R_5$ is $C_1-C_4$ alkyl or phenyl);

W, Y=H or $C_1-C_4$ alkyl; and

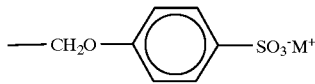

(wherein: M is ammonium or alkali metal, $R_6$ is $C_1-C_4$ alkyl, and x is an integer of at least 1); or

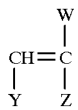

(wherein M is ammonium or alkali metal);

a and b are positive integers of at least 1;

the ratio of a/b is at least 1/100;

n=a positive integer of 10–100; and m=a positive integer of 0–50.

2. The deinking agent of claim 1 wherein (the ratio of the ratio of n/m is at least 1.5.

3. The deinking agent of claim 1 further characterized in that it possesses a molecular weight of 2,000 to 100,000.

4. A deinking agent comprising a copolymer of: (1) an anionic type ethylenically unsaturated monomer having the formula

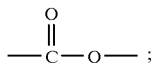

W, Y are H or $C_1-C_4$ alkyl,

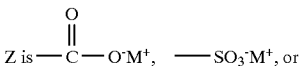

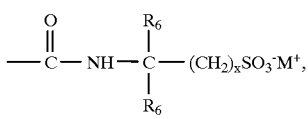

or

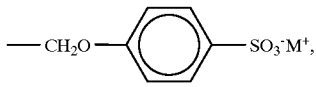

wherein M is ammonium or alkali metal, $R_6$ is $C_1-C_4$ alkyl, x is a positive integer of at least 1; and (2) at least one surfactant macromonomer selected from the group consisting of a). 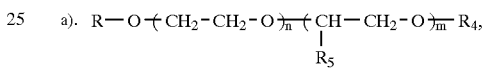

b). 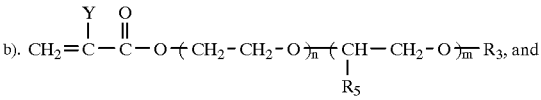

c). 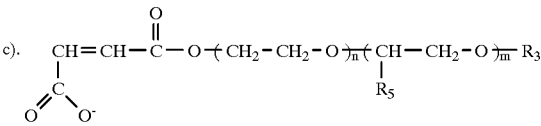

wherein

R is $C_3-C_{22}$ alkenyl or carboxy alkenyl;

$R_3$ is H or straight or branched chain $C_1-C_{22}$ alkyl or alkylphenol;

$R_4$ is H or $C_1-C_4$ alkyl or phenyl;

Y is H or $C_1-C_4$ alkyl;

n is a positive integer of 10–100; and m is a positive integer of 0–50; and n/m is at least 1.5 when m ≠0 where the molar ratio of (2) at least one surfactant macromonomer to (1) anionic type ethylenically unsaturated monomer is at least 1/100.

5. The deinking agent of claim 4 wherein the amount of surfactant macromoncmer copolymerized with the anionic type ethylenically unsaturated monomer is at least 10% (by wt).

6. The deinking agent of claim 1 further characterized in that it possesses a molecular weight of at least 2,000.

* * * * *